Figure 1:
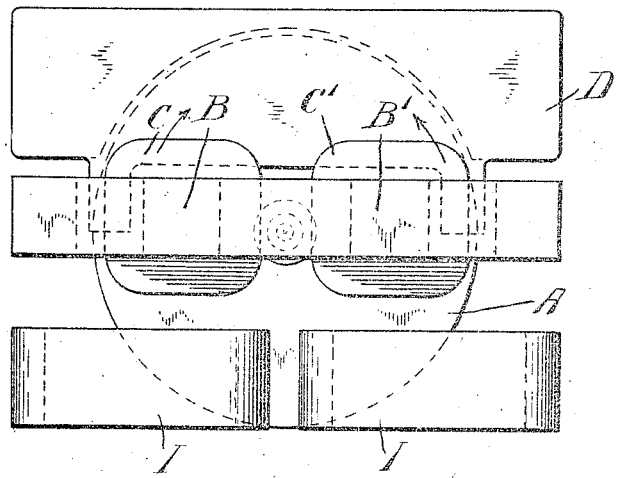

W. STANLY.
ALTERNATE CURRENT METER.
APPLICATION FILED MAR. 21, 1906.

941,469.

Patented Nov. 30, 1909.
2 SHEETS—SHEET 1.

Witnesses
Chas. W. Pearl
L. Vreeland

Inventor
WILLIAM STANLY.
By his Attorneys
Bartlett, Brownell & Mitchell

W. STANLY.
ALTERNATE CURRENT METER.
APPLICATION FILED MAR. 21, 1906.

941,469.

Patented Nov. 30, 1909.
2 SHEETS—SHEET 2.

Witnesses

Inventor
WILLIAM STANLY.
By his Attorneys

UNITED STATES PATENT OFFICE.

WILLIAM STANLY, OF GREAT BARRINGTON, MASSACHUSETTS, ASSIGNOR TO GENERAL ELECTRIC COMPANY, A CORPORATION OF NEW YORK.

ALTERNATING-CURRENT METER.

941,469.  Specification of Letters Patent.  Patented Nov. 30, 1909.

Application filed March 21, 1906. Serial No. 307,174.

*To all whom it may concern:*

Be it known that I, WILLIAM STANLY, a citizen of the United States, residing at Great Barrington, county of Berkshire, Massachusetts, have invented certain new and useful Improvements in Alternate-Current Meters, of which the following is a full, clear, and exact description.

My invention relates to alternate current meters, and has for its object to provide a simple meter having a mechanically simple high torque motive device in which the resultant torque is due to the differential action of two independent torque-producing devices upon a common disk, and constitutes an improvement upon the apparatus described in my applications, Serial No. 288,643, filed November 23, 1905, Serial No. 306,728, filed March 19, 1906.

In the applications above referred to, I have described a device employing two independent alternating current motors having their rotary members connected to a common staff or shaft, and acted upon by their respective inductors, the construction being such that neither inductor produces currents in the conductor acted upon by the other. The torques of the two motor devices vary as the squares of the fluxes of their respective inductors and are opposed to one another, with the result that the resultant torque varies as the difference of the squares of said fluxes.

The present invention relates to means for accomplishing the same result, in which two motor devices are not physically independent, since the same induced system is acted upon by the two inductors. The construction is such, however, that independent torques only are produced. The elimination of one disk results in a simplified form of apparatus that nevertheless possesses the desirable properties and qualities set out in the application above referred to.

When a common induced body is used, it is necessary in order that the apparatus may be subjected to a torque which is rigorously proportional to the energy of the circuit to which it is connected, that the independence of each motor be preserved, and that no mutual reaction shall take place between either inductor and the currents produced by the other, or between one induced current and the field produced by the other induced current, such as will influence the torque of either motor.

In instruments of this class, as described in the application mentioned, in order to measure the true energy of the circuit, the resultant torque is proportional to the formula $(a+b)^2 - (a-b)^2$, where $a+b$ and $a-b$ represent the vector sum and difference of two currents proportional to the electromotive force and the current of the circuit to be measured.

The following is a description of apparatus embodying my invention, reference being had to the accompanying drawings, in which—

Figure 2:
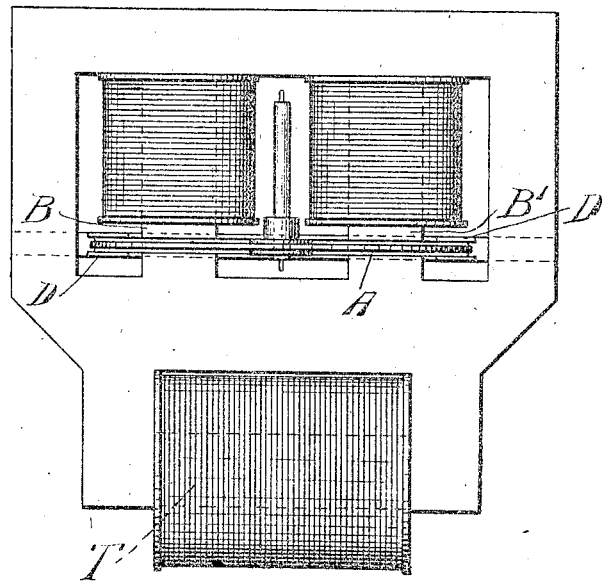
Figure 3:
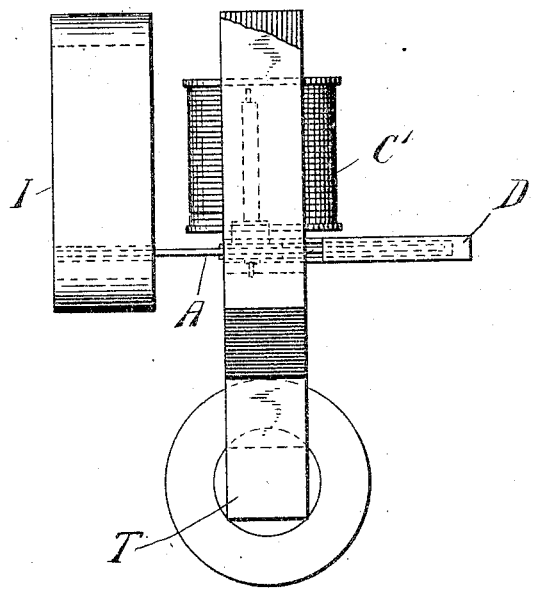
Figure 4:
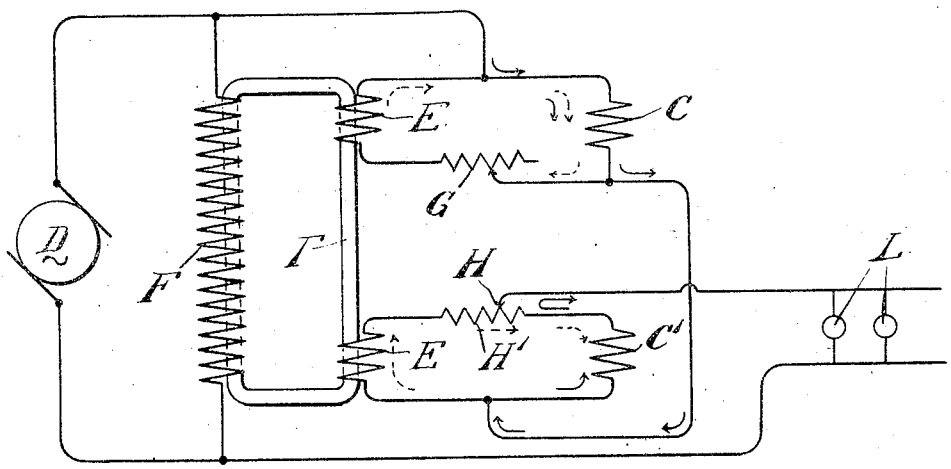

Figure 1 is a plan view of a meter embodying my invention. Fig. 2 is a front elevation of the same with the brake magnets removed. Fig. 3 is a side elevation of Fig. 1, and Fig. 4 is a diagram of circuits.

Referring more particularly to the drawings, A is a rotatable member, preferably a disk. It is formed of conducting material, preferably of very low resistance. B B' are two poles energized by the windings C C' and producing magnetic fields proportional respectively to the vector sum and to the vector difference of currents that represent by their values the electromotive force and current of the circuit to be measured. D is an attracting armature of iron, arranged in such a position that the eddy or secondary currents induced in the disk produce strong magnetic fields in it, which react upon said currents to produce torques in the disk, as indicated by the arrows (Fig. 1). The energizing winding C C' are preferably single windings, as shown in the diagram Fig. 4, in series with the generator D and translating devices L, as distinguished from the double windings shown and described in my application above referred to. When these single windings are used, they are shunted respectively by the secondaries E E of a transformer, whose primary F is connected across the mains, whose electromotive force is to be measured. An adjustable resistance G is provided for equalizing the impedances of the circuits E C and E C', and an adjustable connection H between the main circuit and a resistance H' in the circuit through one of the secondaries is provided for equalizing the components of the current to be measured in the two coils C C'. The current to be measured flows through the coil C' in the opposite direction to its direction of flow through the coil C, with the result that in the coil C the currents from the generator to be measured and the current from the secondary E flow in the same direction, while in the coil C', the current to be measured and the current from the secondary E flow in opposite directions, as indicated by full and dotted arrows, respectively. The electromotive forces in the secondaries E E are displaced by 180° from the electromotive force at the terminals of the primary F, and are, therefore, in phase with the electromotive forces impressed upon the terminals of the coils C C', through the conductors leading directly from the generator. The secondary current and the component of the work current flowing through the coil C will, therefore, be in phase when the work current is of unity power factor, while the currents in the coil C' will be directly opposed to one another. The resultant current in the coil C will, therefore, be equal to $a+b$, where $a$ represents a current proportional to the electromotive force and $b$ represents a current proportional to the work current, and the resultant current in C' will be equal to $a-b$. When the current in the work circuit lags, the currents in C and C' will be respectively the vector sum and difference of $a$ and $b$ and will produce corresponding fluxes acting upon the rotatable member.

The reactions here taking place have been fully described in my application above referred to. When the coils C C' are diametrically placed and an armature is used, the reactions described result in the production of two torques varying as the squares of their respective fluxes, on opposite sides of the center of the disk, which, therefore, oppose one another, and which, if of equal value, have no effective resultant. This is the condition of the instrument when the circuit to which it is attached is not conveying or delivering energy to translating devices, a condition which may exist either with no current upon the work circuit or when that current is displaced from its electromotive force by exactly 90°. In either of these cases, the torques of the two motors are of equal value, and if applied on opposite sides of a diameter at equal distances from the center of the disk are ineffective in producing resultant motion. If, however, a current conveying energy is traversing the work circuit and therefore possesses a component which is in phase with its electromotive force, the values of the magnetizations employed, as above described, are no longer equal, but the magnetization is superior upon the side $a+b$ and inferior upon the opposite side, so that a resultant torque proportional to $(a+b)^2 - (a-b)^2$ is produced.

In carrying out the invention and employing an armature, I have found that the theoretical position at which independence of the two motor devices exists is not on opposite sides of the center of the disk, but that the two inducing fields should be upon a line parallel to the diameter and at a distance therefrom depending upon the linear and electrical dimensions of the structure employed; thus, if inductors are applied to a very large disk, the independence of action is obtained when the fluxes are very near to the diameter of the secondary member, while, if a small structure is employed, the independence of action is obtained only when a line joining the fluxes is parallel and removed to a considerable distance from such diameter. Again, independence of action of the two motors is obtained by displacing the fluxes but a very small distance from the diameter when the reluctance of the attracting armature to the flux induced in it is great, and conversely, the impressed fields of the two motors must be displaced farther from the diameter when the reluctance of the attracting armature is small. By suitably choosing the points of application of the fluxes, according to the rules thus laid down, absolute independence of action between the two motors can easily be obtained, even when such motors are energized by fluxes of different phase. The phenomena that would cause mutual reactive effects to be exerted by one motor upon the other when the inducing poles are diametrically opposite,—which effects it is necessary to eliminate in order to secure independence of motor action,—are complicated and somewhat difficult to explain, but I attribute such re-active effects occurring when the fields of the two motors are energized by phase-different fluxes to the torque exerted by eddy currents produced by the field of one motor upon the field produced by the eddy currents of the other motor; that is to say, the eddy currents or secondary currents induced by one field under these conditions flow through the field produced by the secondary currents of the other motor and react thereon. Such reaction would evidently produce a disturbing torque component depending upon the phase relationship of the two fields and not necessarily upon their values, and would, therefore, if not eliminated, introduce into the torque equation of the meter a torque component in quadrature with that desired, and this reaction would be apparent when the meter was called upon to measure lagging or leading currents delivered to the work circuit.

If the windings C C' are such that when the work current is of unity power factor, the poles presented to the disk are of the same sign, the result is that when lagging currents are used, the pole energized by the winding C' (a—b) will be earlier in phase than the pole energized by the winding C (a—b). If the armature D were absent the counter clockwise torque might then be produced upon the disk by a rotating field action. With the armature D present, however, and properly placed, this torque is eliminated, and the resultant torque produced upon the disk is in a clock-wise direction and independent of any phase difference, depending entirely upon the field strengths of the two opposing motors. If the windings C C' are such that when the work current is of unity power factor the poles presented to the disk are of opposite sign, the result is that when lagging currents are used the pole energized by the winding C' is later in phase than the pole energized by the winding C. Any torque which might, in the absence of the armature D, be produced by these dephased fields is also eliminated by the proper adjustment of the armature D, so that in this case also the resultant torque produced upon the disk is in a clockwise direction and independent of any phase difference, the same as in the other case. The resultant torque is proportional to the energy of the current to be measured and such proportionality is maintained by the elimination of phase-differing actions produced by the fields employed in developing the torque of the instrument in contradistinction to the apparatus of the prior art in which the torque of the instrument is solely proportional to and is due to such phase difference.

The meter above described operates and is effective solely because of the difference of values of the fluxes employed in its two component motor devices, the relative phase relationship of such fluxes being ineffective to produce the torque.

Embracing one member of the disk are permanent magnets I which act to retard its movement, the action having the proper retarding law for the instrument. The core T, surrounded by the transformer windings E E and F may be formed from the same stampings which are used to form the magnetic circuits for the energizing coils C C', as shown in Figs. 2 and 3, the magnetic circuits being made of laminated iron, in the usual manner.

My invention permits of various modifications in form and proportion of parts, the form which I have shown and described, being, however, the one preferred by me.

What I claim is:—

1. In an alternate current meter, two independent inductors, a secondary element common to said inductors and inductively acted upon thereby, and means for eliminating torque produced by the mutual reactive effects of said inductors and for establishing opposing torques.

2. In an alternate current meter, two independent inductors, a common secondary element acted upon inductively by said inductors, and an armature for causing said inductors to produce a resultant torque proportional to the energy of the circuit to be measured by the difference of value of their fluxes.

3. In an alternate current meter, a movable element, means for producing two fields acting inductively upon the common movable element, and means for eliminating the torque due to the phase difference of said fields and establishing opposing torques and thereby producing resultant torque proportional to the energy of the current to be measured.

4. In an alternate current meter, electromagnets wound so as to produce fluxes proportional to the vector sum and vector difference of magnetizing forces proportional to the potential and volume of current to be measured, a common disk acted upon by the electromagnets, and an armature for causing currents induced in said element to establish opposing torques.

5. In a meter, a magnetic structure composed of three magnetic circuits, coils surrounding two of said circuits wound so as to produce fluxes proportional to the vector sum and vector difference of magnetizing forces proportional to the potential and the volume of current to be measured, and primary and secondary windings surrounding the third circuit.

6. In an alternate current meter, the combination of a movable conducting body, two polar projections, energizing coils wound so as to produce fluxes proportional to the vector sum and vector difference of magnetizing forces proportional to the potential and volume of current to be measured, and a magnetic armature located adjacent to said poles so as to produce opposing torques.

WILLIAM STANLY.

Witnesses:
JOSEPH C. FREIN,
J. M. S. STONE.